(No Model.)
2 Sheets—Sheet 1.
T. McDOWELL.
MANIFOLDING MEMORANDUM BOOK.
No. 585,394. Patented June 29, 1897.
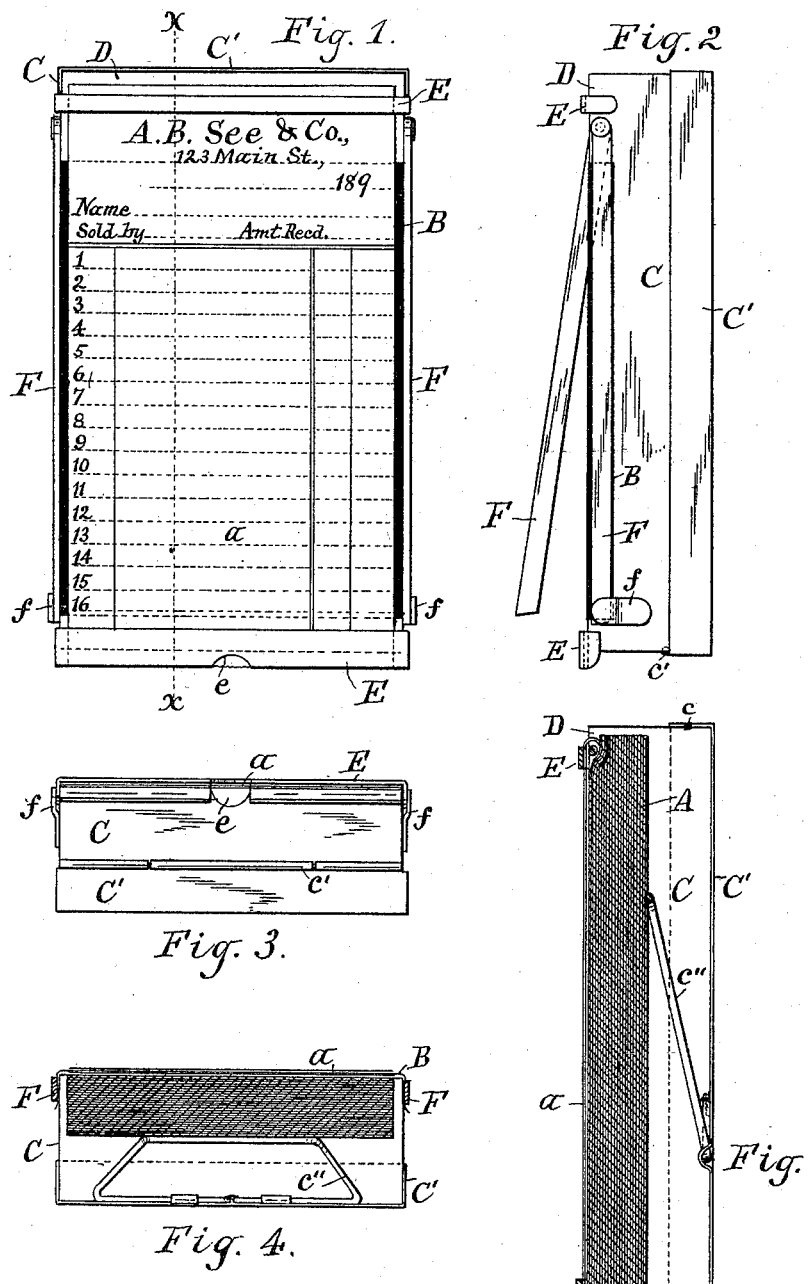
Witnesses:
Mark W. Dewey
R. S. Geary
Inventor.
Thomas McDowell
By C. H. Duell,
his Attorney.

(No Model.) 2 Sheets—Sheet 2.

T. McDOWELL.
MANIFOLDING MEMORANDUM BOOK.

No. 585,394. Patented June 29, 1897.

Witnesses:
Mark W. Dewey
R. S. Dewey

Inventor.
Thomas McDowell
By C. H. Duell
his Attorney.

UNITED STATES PATENT OFFICE.

THOMAS McDOWELL, OF NIAGARA FALLS, NEW YORK, ASSIGNOR TO THE CARTER-CRUME COMPANY, OF SAME PLACE.

MANIFOLDING MEMORANDUM-BOOK.

SPECIFICATION forming part of Letters Patent No. 585,394, dated June 29, 1897.

Application filed March 18, 1895. Serial No. 542,093. (No model.)

*To all whom it may concern:*

Be it known that I, THOMAS McDOWELL, of Niagara Falls, in the county of Niagara, in the State of New York, have invented new and useful Improvements in Manifolding Memorandum-Books, of which the following, taken in connection with the accompanying drawings, is a full, clear, and exact description.

My invention relates to manifold memorandum-books, and the object is to provide a holder or case for the leaves, which are in a continuous strip and folded in a zigzag form, that will completely cover and protect the leaves on all sides and at the same time allow the withdrawal of the leaves successively and the insertion of a block of leaves, when desired, easily and quickly.

The object also is to provide a smooth even writing-surface on one side of the holder and suitable means for holding the carbon-sheet on the side of the holder or case.

To this end my invention consists in the combination and arrangement of the several parts, as will be hereinafter described, and pointed out in the claim.

Figure 6:
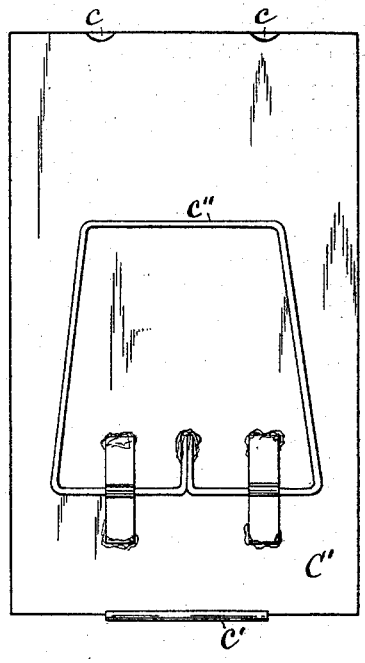
Figure 7:
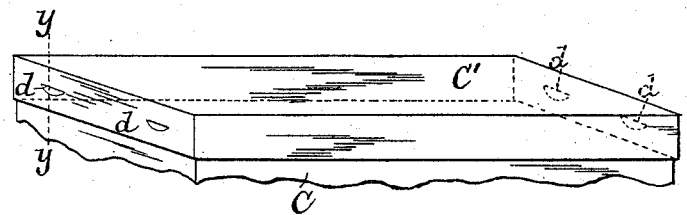
Figure 8:
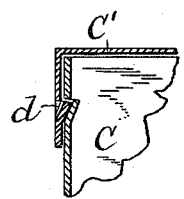

In the drawings hereto annexed and forming a part of this specification, Figure 1 is a top view of the support or case with a leaf or pair of leaves drawn out and lying upon the writing-surface of the support. Fig. 2 is a side view of the support with one of the carbon-sheet clamps partly open. Fig. 3 is an end view of the support. Fig. 4 is a cross-sectional view of the support and inclosed leaves. Fig. 5 is a vertical longitudinal section on line $x$ $x$ of Fig. 1. Fig. 6 is a view of the inner side of the bottom. Fig. 7 shows a modified form of bottom which is not pivoted but secured to the support by catches pressed or formed in the ends thereof. Fig. 8 shows one of said catches enlarged and in section, taken on line $y$ $y$ of Fig. 7; and Fig. 9 shows clearly the manner in which the duplicating block of leaves is folded and the position of the carbon-sheet in relation thereto, so that a copy of the original will be made.

I do not desire to be limited to a block of leaves containing duplicate leaves, as shown, for it will be obvious that there may be triplicate leaves also, and, further, when triplicate leaves are provided more than one carbon-sheet may be employed in order that two copies may be made of the original.

Figure 9:
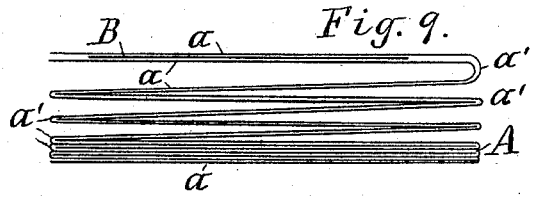

Referring specifically to the drawings, A indicates the block of leaves of paper, and consists, as shown clearly in Fig. 9, of the double layers of strips, which are folded back and forth in zigzag form with the folds $a'$ compressed and perforated, so that the leaves $a$ may be separated easily after being written upon, and B is the carbon-sheet lying between the upper pair of leaves.

C is the support or case inclosing the block of leaves and consists of a shallow rectangular metallic box somewhat larger than a complete block of leaves and having its bottom $C'$ removable or pivoted at one end and formed as a cover or lid of a box is usually formed. The bottom is provided with suitable catches or fastenings $c$ $c$ at the end opposite the pivoted end $c'$, so that it cannot drop down or open when not desired. On the inner side of this bottom is an angular spring-bail $c''$, which is firmly secured to the bottom by straps and solder to maintain a constant pressure against the lower side of the block A to prevent displacement during the withdrawal of the leaves, as hereinafter described, especially when the supply is nearly exhausted. Instead of a pivoted bottom or hinging it at one end it may be held to the case by suitable indentations $d$ $d$ at each end, as shown clearly in Figs. 7 and 8 of the drawings.

In the top side of the case, at one end thereof, is a slot D, through which the strips are drawn after the block is inserted in the case, and across the top side of the case at each end thereof are metal straps or thin bars E E of metal to hold the leaves in place, said leaves being drawn beneath these straps. The bar E at the front end of the case and the end also is provided with a recess $e$ to allow the leaves to be drawn out after they are written upon. After being drawn out until the perforated line $a'$ reaches the front edge of the bar E, the pair of leaves may be torn off, leaving a new pair in place on the top of the case.

It will be unnecessary to describe the printing and ruling on the original leaves, as any suitable and well-known printing and ruling may be provided.

In order to secure the carbon-sheet B to the case, I provide a latch on each side of the case consisting of a strip of metal F, pivoted at one end to the side of the case and lying, when closed, with its opposite end in a catch $f$, secured to the side of the case for the purpose of binding the strip closely to the case to prevent the displacement of the carbon-sheet, which extends across the top side of the case and lies with its side edges between the sides of said case and the strips F F. The carbon-sheet does not in any way interfere with the movement of the paper-strips when they are drawn from the case. The bar E near the back end of the case also serves to form stops for the strips F F when opened widely. One of the strips F is shown in Fig. 2 partly open.

I do not wish to be limited to the precise form of latches shown, as they may be varied somewhat in shape without departing from my invention.

Having described my invention, what I claim as new, and desire to secure by Letters Patent, is—

In a manifold memorandum-book, the combination with a manifold-tablet, of an inclosing case having a detachably-connected bottom, provided with a spring-pressed bail bearing against the under side of the tablet, the transverse bars for retaining the said tablet within the casing, and the pivoted side bars and catches for retaining the carbon-sheet, substantially as described.

In testimony whereof I have hereunto signed my name.

THOMAS McDOWELL. [L. S.]

Witnesses:
JOHN RAE DICKSON,
WILLIAM ELLIS GRIFFITH.